April 18, 1961 G. D. LETZLER 2,980,465
VEHICLE WITH TELESCOPING SHELTER AND DRAWER-TYPE BED
Filed Dec. 15, 1958 2 Sheets-Sheet 1
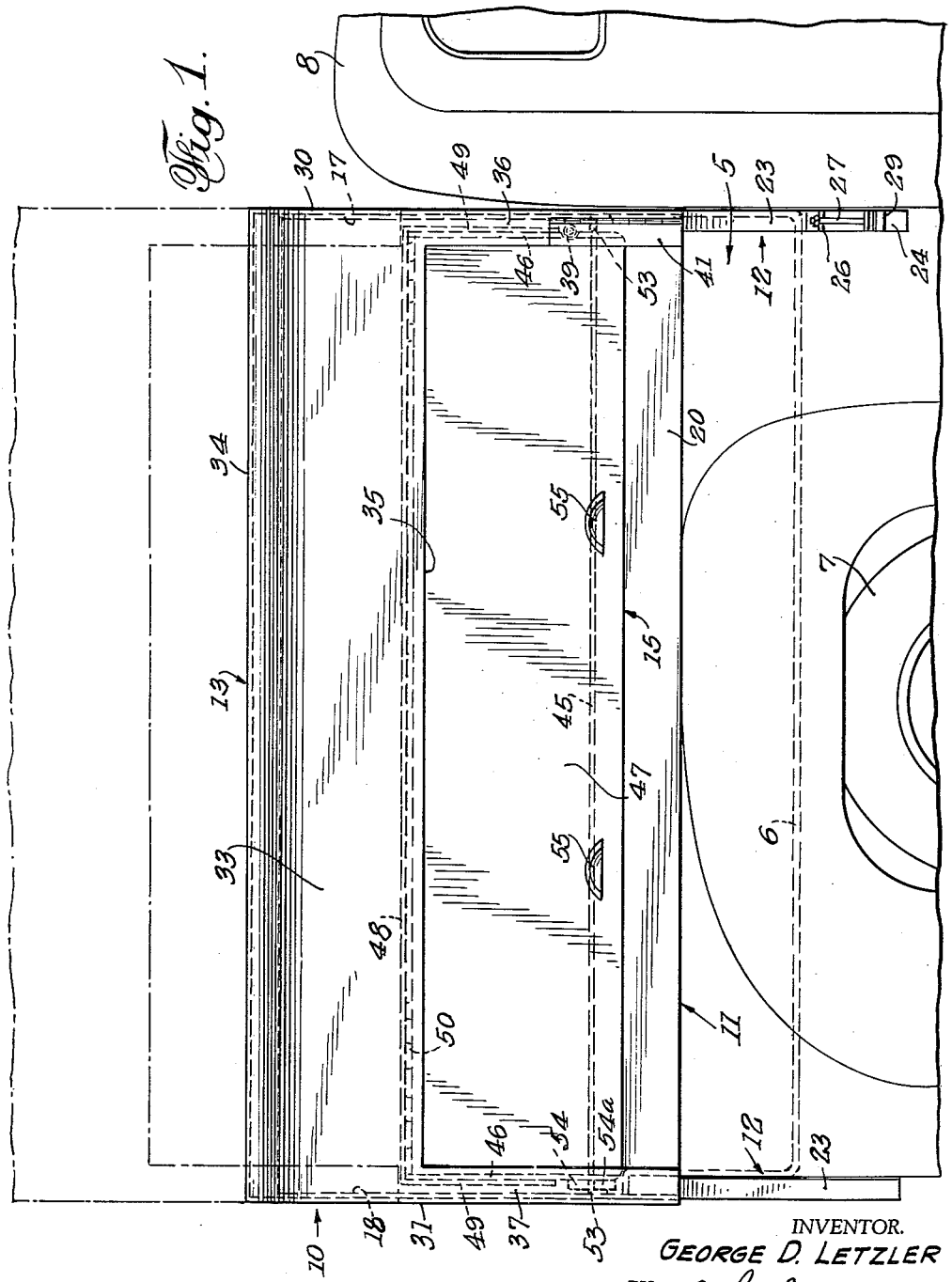
INVENTOR.
GEORGE D. LETZLER
BY C. F. Stratton
ATTORNEY

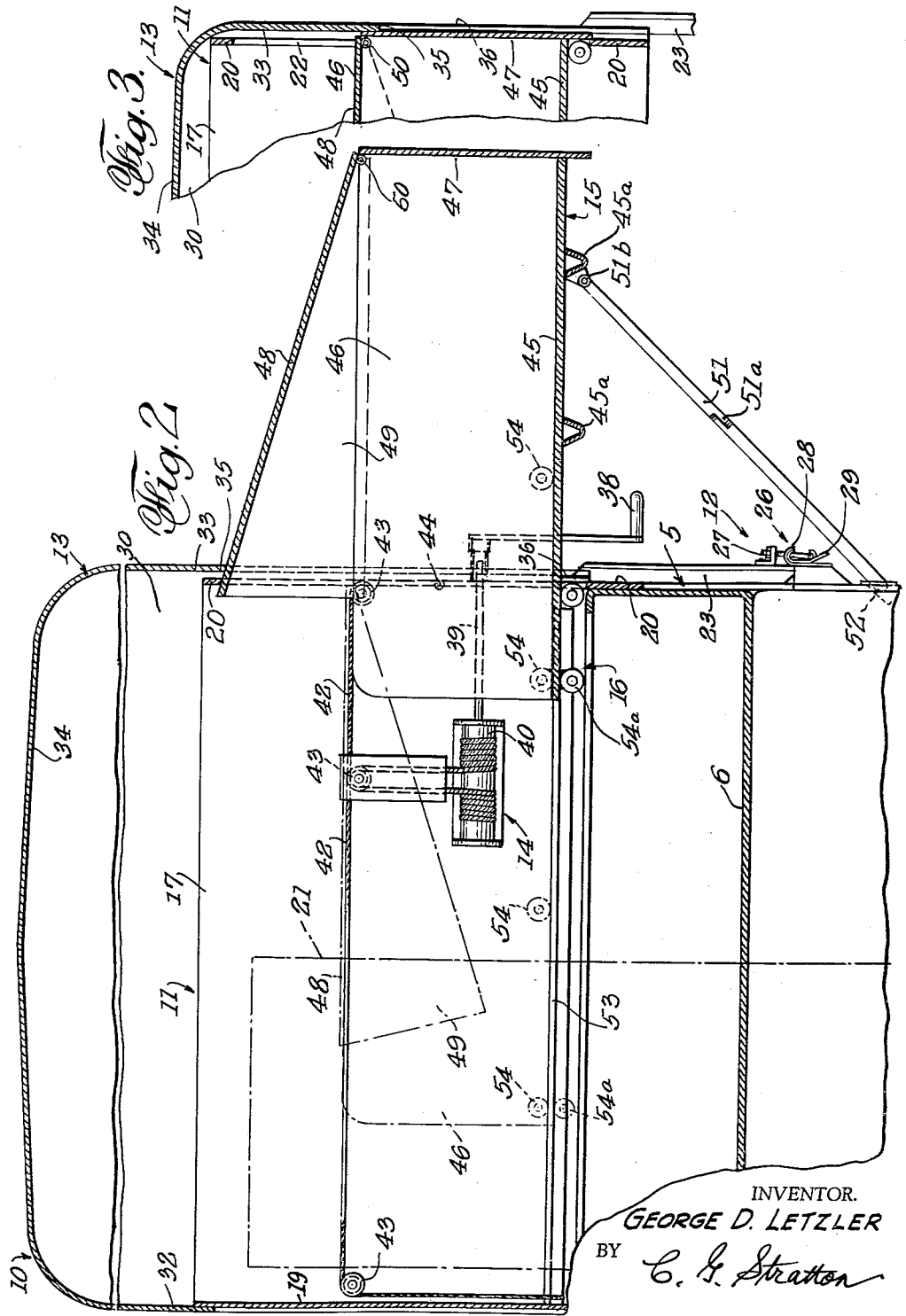

United States Patent Office 2,980,465
Patented Apr. 18, 1961

2,980,465

VEHICLE WITH TELESCOPING SHELTER AND DRAWER-TYPE BED

George D. Letzler, 20741 Community St., Canoga Park, Calif.

Filed Dec. 15, 1958, Ser. No. 780,318

8 Claims. (Cl. 296—23)

This invention relates to a convertible shelter, being primarily concerned with conversion of a vehicle-mounted housing into a bed-provided shelter. An object of the present invention is to provide such a convertible device.

It is desirable that vehicle-mounted camping and similar shelters be as compact as practicable, especially when the vehicle is on the road. The provision of a bed and also of work space in such a shelter ordinarily entails such increase in size of the shelter that road clearances are frequently hazardous or, at least, the same present clearance difficulties from time to time. This is true of both width and height clearances. Therefore, it is another object of the present invention to provide a shelter that may be arranged in compact road-travelling form and, when desired to be used for camping purposes, converted into a usable shelter having a bed.

Another object of the invention is to provide a shelter that has quick-release fastenings that enable ready installment and removal of the shelter on the body of a pickup type of truck or the like.

A further object of the invention is to provide a convertible shelter in which the bed is movable to usable position only after the shelter top is raised to give head-clearance height to the device, said top locking the bed against lateral outward projection until the same is raised. Thus, the invention is characterized by safety.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a side elevational view of a convertible shelter in contracted position and shown mounted on an automotive vehicle.

Fig. 2 is a broken cross-sectional view of said shelter in its extended position of use.

Fig. 3 is a fragmentary cross-sectional view of the right side of the shelter in the position of Fig. 1.

The vehicle that is shown in the drawings represents a conventional type of pickup truck that may serve to mount the present shelter. Thus, in the usual way, the truck body 5, having a floor 6, is mounted on rear wheels 7, the same ordinarily being controled from a cab 8 at the front of the body. It will be realized that said body 5 may be that of a trailer or any other suitable type of vehicle.

The present shelter 10 is disposed over the body 5 and comprises, generally, a lower, fixed housing 11, means 12 detachably mounting the housing 11 on said body 5, an upper, movable housing 13 telescopically engaged with the lower housing 11, means 14 to raise the housing 13, a laterally movable bed 15, and means 16 for guiding the movement of said bed between a position contracted into the interior of the two-part housing 11, 13 and an extended position laterally of one of the sides of said housing.

The lower housing 11 comprises a structure of generally rectangular tubular form, the same having a front wall 17, a rear wall 18, a left side wall 19, and a right side wall 20. In practice, said housing may be positioned on the truck body 5 so that said walls 17, 18, 19 and 20 comprise approximate extensions of the walls of the body 5. Regardless how related, the body floor 6 comprises the bottom or floor of the housing 11, although, if desired, a separate bottom or floor may be provided. The walls 17 and 19 need not have openings. The wall 18 is preferably provided with an access opening 21 (shown in dot-dash lines in Fig. 2), a door in the usual way being provided to close the same. By placing said opening 21 at the rear and to the left side of the housing 11, entry to the interior of said housing may be had from the rear of the vehicle, the tailgate thereof, if any, being removed. The right side wall 20 is provided with a rectangular opening 22 that extends substantially the entire length of said wall.

The detachable means 12 is preferably provided at the four corners of the housing 11 and the same are preferably of the snap or quick-release type so that a quick change-over may be made with easy facility. Each of the four means, of which two are shown, comprises a rigid extension 23 on the housing 11, a block 24 affixed to the truck body or any other fixed part of the vehicle, and a quick-release catch 26 carried, in part, by the extension 23 and, in part, by the block 24 connecting said extension and block. In this case, a swing bolt 27 is employed for effecting the connection, the same being swingable around a fulcrum 28 upon forward pull on the tail 29. This catch is, of course, exemplary of other quick detach means that may be used.

It will be understood that housing 11 may be slid onto the truck body from the rear and the means 12 connected to rigidly connect said housing to the body to form an upper extension of the body.

The upper housing 13 comprises a front wall 30, a rear wall 31, a left side wall 32, and a right side wall 33. Said walls are connected by a top 34 which constitutes a ceiling. The walls of housing 13 telescopically fit over and outside of the walls of housing 11. Thus, a two-part housing is provided, the same having a floor 6 and a ceiling 34. Similar to walls 17 and 19, the walls 30 and 32 do not have openings. Wall 31 has an opening registering with the opening 21 in wall 18, and the wall 33 at the right side has a recess type of opening 35 in general register with the opening 22 in wall 20. The opening 35 is quite long and removes such portions of the wall 33 as to leave front and rear corner pieces 36 and 37, respectively, as depending portions of the latter wall.

The means 14 to raise the housing part 13 is operated by a crank 38 that connects to a shaft 39 of a drum 40 secured to the inner face of the wall 17. Access to said shaft is had by outwardly swinging a hinged portion 41 of the corner piece 36. Said drum 40 winds up cables 42 that are trained over suitable pulleys 43 and are connetced to the upper housing 13. One of such connections is shown at 44 and it will be evident that the crank 38 may be turned to raise the housing 13 as by the means described and that said housing may lower gravitationally. If desired, suitable latches or locks may be used in connection with the means 14 to lock the same after the housing 13 is raised. Other types of mechanism, for instance, self-locking gearing, may be used for this purpose.

The bed 15 is shown in the form of a drawer having a bottom or floor 45, end walls 46, and a side wall 47. As shown in Fig. 3, the bed is disposed in the opening 22 of the fixed housing 11 and, when closed, the wall 47 thereof is disposed against the outer face of the wall 20 of said housing 11. It will be noted from Figs. 1 and 3 that the bed wall 47 is disposed inward of the right wall 33 of the housing 13 and that the same is longer than opening 35 and its top edge extends above the upper edge of said opening. As a consequence, when the housing 13 is in its lowered position, the margins of wall 33 that overlap the edges of bed wall 47 serve to retain the bed in retracted position, as in Fig. 3 and shown by the dot-dash lines of Fig. 2. It will be noted that, in the extended position of Fig. 2, the portion of the bed that laterally overhangs the side of the shelter housing is enclosed at the ends and at the outer side and is open on the inner side into the interior space of the shelter.

A hinged top 48 is provided for the bed, the same having end wings 49 that reside outwardly of end walls 46. The hinge 50 for the top 48 is provided along the upper edge of wall 47 so that said top may be swung upwardly at the angle shown in Fig. 2, when the bed is extended. Suitable fasteners for the top may be provided to hold the same raised. In the above manner, the overhanging portion of the bed is completely enclosed.

When extended, the bed may be braced by folding props 51 that are carried by the bed bottom and brace against any suitable portion of the side of the vehicle, as at 52. The hinge 51a intermediate the ends of the prop enables the folding of the prop to half its length when serving as a brace. After folding, the same may be swung on swivel 51b to lie beneath the drawer floor between the reinforcements 45a of said floor.

The bed-guiding means 16 is here shown as rails 53 carried by the front and rear walls 17 and 18 of the fixed housing 11, and suitable rollers 54 carried by the bed and engaged with said rails. The preferred arrangement of said rollers is such as to not only support the bed when the same is retracted and partly extended but also to obviate downward tilt of the bed, when extended and before the props or braces 51 are in place. The hanger rollers 54a prevent such tilting.

Because of the doorway 21 at the rear end of the housing, the rail 53 at said end may terminate at the edge of the door. Thus, the rollers 54 and 54a at the left side of the bed, when the bed is retracted, will move past the rail end. However, these rollers will be engaged with the other rail to provide for proper guiding.

It will be evident that, from the closed, retracted position of the housing, the bed may be pulled out laterally by means of drawer pulls 55 after the upper housing 13 has been raised by the means 14.

The bed retains a horizontal position at all times. Thus, the same may accommodate bedding without displacement thereof and also store items upon the bedding when the bed is retracted. The low clearance and compactness, when the shelter is lowered and the bed retracted is obvious.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. A vehicle-mounted shelter comprising a two-part housing having a lower housing part and an upper housing part telescopically engaged with the lower part, the upper part having a side opening, a bed structure carried by the lower part and retained in retracted position entirely within the shelter by the upper part, said bed structure being provided with a fixed outer side wall that closes the side opening in the upper part when the bed structure is in retracted position, means to upwardly extend the upper part to release the bed structure, means to guide the bed structure for movement between retracted position and an extended position laterally of the housing, and a top for the bed hingedly connected to the side wall thereof and extending over the bed when the bed is extended and into the upper portion of the side opening in the upper part.

2. A vehicle-mounted shelter according to claim 1 in which the lower housing part is provided with downwardly extending members, and means are provided on the vehicle mounting the shelter for releasably connecting said members to the vehicle.

3. A vehicle-mounted shelter comprising a two-part housing having a lower housing part and an upper housing part telescopically engaged with the lower part, the upper part having a side opening, a bed structure carried by the lower part and retained in retracted position entirely within the shelter by the upper part, said bed structure being provided with a fixed outer side wall that closes the side opening in the upper part when the bed structure is in retracted position, means to upwardly extend the upper part to release the bed structure, guides provided in the lower housing part and engaged by rollers carried by the bed structure to guide said structure between retracted and laterally extended positions, and a top for the bed hingedly connected to the side wall thereof and extending over the bed when the bed is extended and into the upper portion of the side opening in the upper part.

4. A vehicle-mounted shelter according to claim 3 in which braces are provided to support the bed structure in its extended position, said braces extending between the bottom of the bed structure and the vehicle on which the shelter is mounted, and means mounting the braces to move to collapsed condition and movable with the bed to the retracted position of the latter.

5. A shelter comprising a lower fixed housing part mounted on a flat truck body that has a floor, said housing having an open top and one side wall thereof being provided with a rectangular opening substantially as wide as the housing part is long, an upper, roofed housing part telescopically fitted over the fixed part and having a side wall with an opening as wide as the opening in the fixed part, means to move the upper housing part between a raised position in which the side opening in the fixed housing part is fully open and a lowered position in which the mentioned side wall of the upper part closes the upper portion of said opening in the fixed housing part, a bed structure having a fixed outer side wall and mounted on the fixed housing part to move between a retracted position entirely within said fixed housing part with the fixed side wall thereof closing the lower portion of the opening in the fixed housing part with the marginal edges around the opening in the mentioned side wall of the upper housing part over-standing the marginal edges of said outer wall of the bed structure when the upper housing part is lowered to retain the bed structure retracted, and a laterally extended position with the side wall thereof outward of the vehicle body and one side of the housing parts, and a hinged top carried by and covering said bed structure and extending into the opening of the upper housing part to close said opening when said latter part is raised.

6. A shelter according to claim 5 provided with crank-operated cable means to raise and lower the upper housing part, said means having a cable-winding drum carried by the lower housing part on a side wall thereof and having cables wound on said drum with ends connected to said upper part, the crank of said means being connected to rotate the drum to raise and lower the upper housing part and the latter extending beyond a side of the shelter and operable from the outside thereof.

7. A convertible shelter for a vehicle, the shelter comprising a lower housing of rectangular form and having two end walls and two side walls, the lower housing being open at its top and adapted to be mounted on a vehicle with the housing walls extending vertically, one end wall having an access opening therein and a door closing said opening, one side wall having a rectangular opening therein, a bed drawer of rectangular form having a floor, a fixed side wall, and two end walls, the bed drawer being mounted in the lower housing and slidable horizontally to an extended position projecting laterally through said rectangular opening of the lower housing, said side wall of the drawer being disposed against the side of the housing to close said rectangular opening and flush with said one side wall, an upper housing having two end walls, two side walls, and a top, said end and side walls of the upper housing having lower edges and said upper housing having a rectangular form and telescopically fitting over and outside of the lower housing, the upper housing being movable from a lowered or shelter-collapsed position to a raised position, the rear wall of the upper housing having a recess formed therein which is open in the lower edge of said upper rear wall and registering with said door opening, a side wall of the upper housing having a rectangular opening formed therein which is open to the lower edge of said upper side wall and in registry with said rectangular opening of the lower housing, the horizontal axis of the latter rectangular opening being shorter than that of said rectangular opening of the lower housing thereby defining vertically extending corner strips adjacent the end walls respectively of the upper housing which overlap the end marginal portions respectively of the said bed drawer when the bed drawer is received within the lower housing, means to maintain the upper housing in raised position, the drawer having a top hinged to the upper edge of said side wall of the bed drawer and adapted to swing to an inclined position on the hinge for connection to the side edges of said rectangular recess when the upper housing is in its raised position and the drawer is in its laterally extended position.

8. A shelter comprising a lower fixed housing part mounted on a flat truck body that has a floor, said housing having an open top and one side wall thereof being provided with a rectangular opening substantially as wide as the housing part is long, an upper, roofed housing part telescopically fitted over the fixed part and having a side wall with an opening as wide as the opening in the fixed part, means to move the upper housing part between a raised position in which the side opening in the fixed housing part is fully open and a lowered position in which the mentioned side wall of the upper part closes the upper portion of said opening in the fixed housing part, a bed structure having a fixed outer side wall and mounted on the fixed housing part to move between a retracted position entirely within said fixed housing part with the fixed side wall thereof closing the lower portion of the opening in the fixed housing part with the marginal edges around the opening in the mentioned side wall of the upper housing part over-standing the marginal edges of said outer wall of the bed structure when the upper housing part is lowered to retain the bed structure retracted and a laterally extended position with the side wall thereof outward of the vehicle body and one side of the housing parts, and a hinged top carried by and covering said bed structure and extending into the opening of the upper housing part to close said opening when said latter part is raised, the bed structure having end walls that extend from the ends of the side wall thereof partly into the fixed housing when the bed structure is extended, and the hinged top of the bed being provided with end wings that constitute extensions of the end walls of the bed structure, said outer side wall, end walls, top, and end wings forming an enclosure for the bed structure that is open from the inside of the mentioned two-part housing.

References Cited in the file of this patent

UNITED STATES PATENTS

| | | |
|---|---|---|
| 2,182,967 | Kors | Dec. 12, 1939 |
| 2,225,993 | Hornberger | Dec. 24, 1940 |
| 2,493,258 | Massare | Jan. 3, 1950 |
| 2,559,029 | Randolph | July 3, 1951 |
| 2,569,641 | Metherell | Oct. 2, 1951 |
| 2,879,103 | Hall | Mar. 24, 1959 |
| 2,893,780 | Ervine | July 7, 1959 |